(12) United States Patent
Han et al.

(10) Patent No.: US 10,888,843 B2
(45) Date of Patent: Jan. 12, 2021

(54) IMMISCIBLE COMPOSITE CATALYST FOR SYNTHESIS OF HYDROGEN PEROXIDE AND METHODS FOR SYNTHESIZING OF HYDROGEN PEROXIDE USING THE SAME

(71) Applicant: Korea Institute of Science and Technology, Seoul (KR)

(72) Inventors: Sang Soo Han, Seoul (KR); Dong Hun Kim, Seoul (KR); Seung Yong Lee, Seoul (KR); Hyo Bin Nam, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 22 days.

(21) Appl. No.: 15/913,209

(22) Filed: Mar. 6, 2018

(65) Prior Publication Data

US 2019/0111415 A1    Apr. 18, 2019

(30) Foreign Application Priority Data

Oct. 12, 2017    (KR) .................. 10-2017-0132872

(51) Int. Cl.
*B01J 23/52*    (2006.01)
*C01B 15/029*    (2006.01)
*B01J 23/46*    (2006.01)
*B01J 35/00*    (2006.01)
*B01J 23/42*    (2006.01)
*B01J 23/50*    (2006.01)

(52) U.S. Cl.
CPC .............. *B01J 23/52* (2013.01); *B01J 23/42* (2013.01); *B01J 23/464* (2013.01); *B01J 23/468* (2013.01); *B01J 23/50* (2013.01); *B01J 35/002* (2013.01); *B01J 35/0006* (2013.01); *B01J 35/0013* (2013.01); *C01B 15/029* (2013.01); *B01J 35/0033* (2013.01)

(58) Field of Classification Search
None
See application file for complete search history.

(56) References Cited

U.S. PATENT DOCUMENTS

| | | | | |
|---|---|---|---|---|
| 5,292,496 A | * | 3/1994 | Nagashima | ........... C01B 15/029 |
| | | | | 423/584 |
| 6,346,228 B1 | * | 2/2002 | Choudhary | .............. B01J 23/38 |
| | | | | 423/584 |
| 6,958,138 B1 | * | 10/2005 | Devic | ..................... B01J 8/006 |
| | | | | 423/584 |

(Continued)

FOREIGN PATENT DOCUMENTS

| | | | |
|---|---|---|---|
| CN | 102500395 A | * | 6/2012 |
| KR | 2012039992 | * | 4/2012 |

(Continued)

*Primary Examiner* — Melissa S Swain
(74) *Attorney, Agent, or Firm* — Husch Blackwell LLP

(57) ABSTRACT

A catalyst for synthesizing hydrogen peroxide is provided. The catalyst includes first material capable of dissociating hydrogen molecules; and second material capable of suppressing dissociation of oxygen molecules, where one or more interfaces are formed between the first material and the second material. The catalyst can be used as an alternative to the expensive palladium catalysts. In particular, the catalyst can be used for the direct synthesis of hydrogen peroxide.

11 Claims, 6 Drawing Sheets
(1 of 6 Drawing Sheet(s) Filed in Color)

(56) References Cited

U.S. PATENT DOCUMENTS

| | | | | |
|---|---|---|---|---|
| 2004/0126312 A1* | 7/2004 | Butz | ............... | C01B 15/029 |
| | | | | 423/584 |
| 2005/0201925 A1* | 9/2005 | Le-Khac | ............ | B01J 31/2208 |
| | | | | 423/584 |
| 2006/0096869 A1* | 5/2006 | Vanden Bussche | .. | B01F 5/0057 |
| | | | | 205/486 |

FOREIGN PATENT DOCUMENTS

| | | | | | |
|---|---|---|---|---|---|
| KR | 2012039992 A | * | 4/2012 | | |
| KR | 20170025855 A1 | | 10/2014 | | |
| KR | 2017025855 A1 | * | 3/2017 | | |
| WO | WO3070371 A2 | * | 2/2003 | | |
| WO | WO-2008024635 A1 | * | 2/2008 | ............ | B01J 35/002 |

* cited by examiner

FIG. 6

| CATALYSTS | | REACTION TIME | |
|---|---|---|---|
| | | 30min | 60min |
| COMPARATIVE EXAMPLES | Rh | 0.5ppm | 0.5ppm |
| | Ah | 0ppm | 0ppm |
| | Rh + Ag | 0.5ppm | 0.5ppm |
| EXAMPLE EMBODIMENTS | $Rh_{90}Ag_{10}$ | 2ppm | 2ppm |
| | $Rh_{70}Ag_{30}$ | 2ppm | 2ppm |
| | $Rh_{50}Ag_{50}$ | 5ppm | 10ppm |
| | $Rh_{30}Ag_{70}$ | 5ppm | 10ppm |
| | $Rh_{10}Ag_{90}$ | 5ppm | 10ppm |
| | $Rh_{7}Ag_{93}$ | 5-10ppm | 10ppm |
| | $Rh_{5}Ag_{95}$ | 5-10ppm | 5-10ppm |
| | $Rh_{4}Ag_{96}$ | 5-10ppm | 5-10ppm |
| | $Rh_{3}Ag_{97}$ | 5-10ppm | 5-10ppm |
| | $Rh_{2}Ag_{98}$ | 5-10ppm | 5-10ppm |
| | $Rh_{1}Ag_{99}$ | 2ppm | 2ppm | ure, and the scope of the present invention is defined only by the appended claims, along with the full scope of equivalents to which such claims are entitled.

IMMISCIBLE COMPOSITE CATALYST FOR SYNTHESIS OF HYDROGEN PEROXIDE AND METHODS FOR SYNTHESIZING OF HYDROGEN PEROXIDE USING THE SAME

CROSS REFERENCE TO RELATED APPLICATION

This application claims priority to and incorporates herein by reference all disclosure in Korean patent application no. 10-2017-0132872 filed Oct. 12, 2017.

FIELD OF THE INVENTION

The present invention relates to an immiscible composite catalyst for synthesis of hydrogen peroxide and a method for synthesizing hydrogen peroxide using the same; and more particularly, to the catalyst, including first material capable of dissociating hydrogen molecules, and second material capable of suppressing dissociation of oxygen molecules, where one or more interfaces are formed between the first material and the second material.

BACKGROUND OF THE INVENTION

Hydrogen peroxide is used as polish, antiseptic, oxidizer, fuel, etc., in various industries such as pulp and paper, textile, water treatment, compound production, petrochemistry, and semiconductor field. The production of hydrogen peroxide has been increasing every year, and according to Transparency Market Research, the global market for hydrogen peroxide is projected to reach about 6.5 billion dollars by 2023. The direct synthesis reaction of hydrogen peroxide from hydrogen and oxygen is a technically difficult reaction although the reaction itself seems simple, and that is why a commercialization process has not been developed yet. But the market for hydrogen peroxide is expected to grow gradually through the development of eco-friendly process as an alternative to the inefficient process of conventional hydrogen peroxide synthesis.

Meanwhile, noble metal elements such as palladium (Pd) are used as catalysts for the direct synthesis of hydrogen peroxide. These catalysts show high activity in the synthesis but, since the production cost is high due to the expensive noble metal elements, the importance of catalyst development based on low-price elements has emerged to meet the demand of hydrogen peroxide market growing rapidly.

SUMMARY OF THE INVENTION

It is an object of the present invention to solve all the aforementioned problems.

It is another object of the present invention to provide a novel catalyst for synthesis of hydrogen peroxide.

It is still another object of the present invention to provide the novel catalyst with high activity and high efficiency as an alternative to expensive palladium (Pd) catalysts.

It is still yet another object of the present invention to provide a method for direct synthesis of hydrogen peroxide using the novel catalyst.

In accordance with one aspect of the present, invention, there is provided a catalyst for synthesizing hydrogen peroxide, including: first material capable of dissociating a hydrogen molecule; and second material capable of suppressing dissociation of an oxygen molecule, wherein one or more interfaces are formed between the first material and the second material.

In accordance with another aspect of the present invention, there is provided a catalyst composite for synthesizing hydrogen peroxide, including: the first material capable of dissociating a hydrogen molecule; and the second material capable of suppressing dissociation of an oxygen molecule, wherein one or more interfaces are formed between the first material and the second material.

In accordance with still another aspect of the present invention, there is provided a method for direct synthesis of hydrogen peroxide using the catalyst or the catalyst composite.

BRIEF DESCRIPTION OF THE DRAWINGS

The patent or application file contains at least one drawing executed in color.

Copies of this patent or patent application publication with color drawing(s) will be provided by the Office upon request and payment of the necessary fee.

Figure 1:
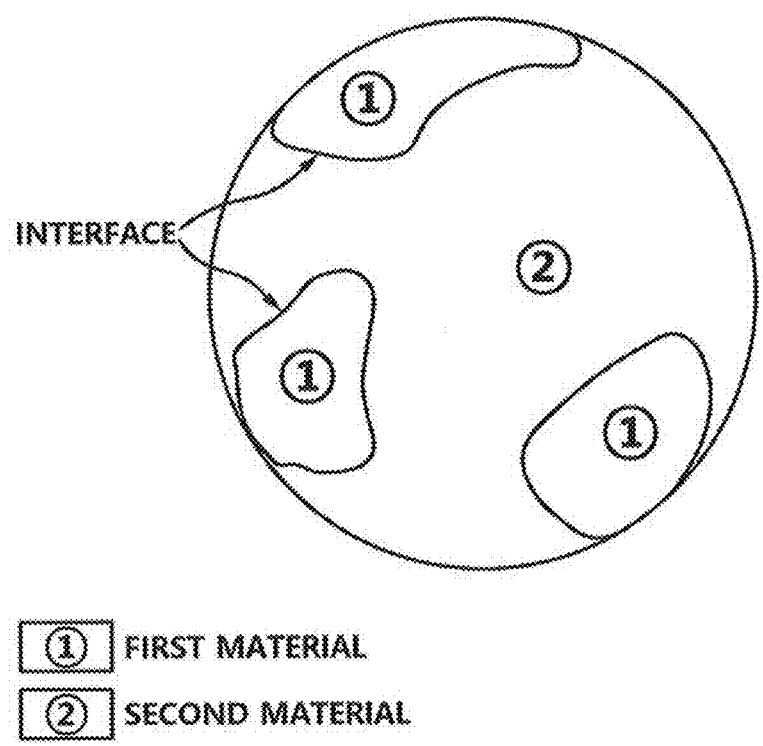

The above and other objects and features of the present invention will become apparent from the following description of preferred embodiments given in conjunction with the accompanying drawings, in which:

FIG. 1 is a drawing representing first material and second material of a catalyst for hydrogen peroxide synthesis with interfaces between the first material and the second material in accordance with one example embodiment of the present invention.

Figure 2:
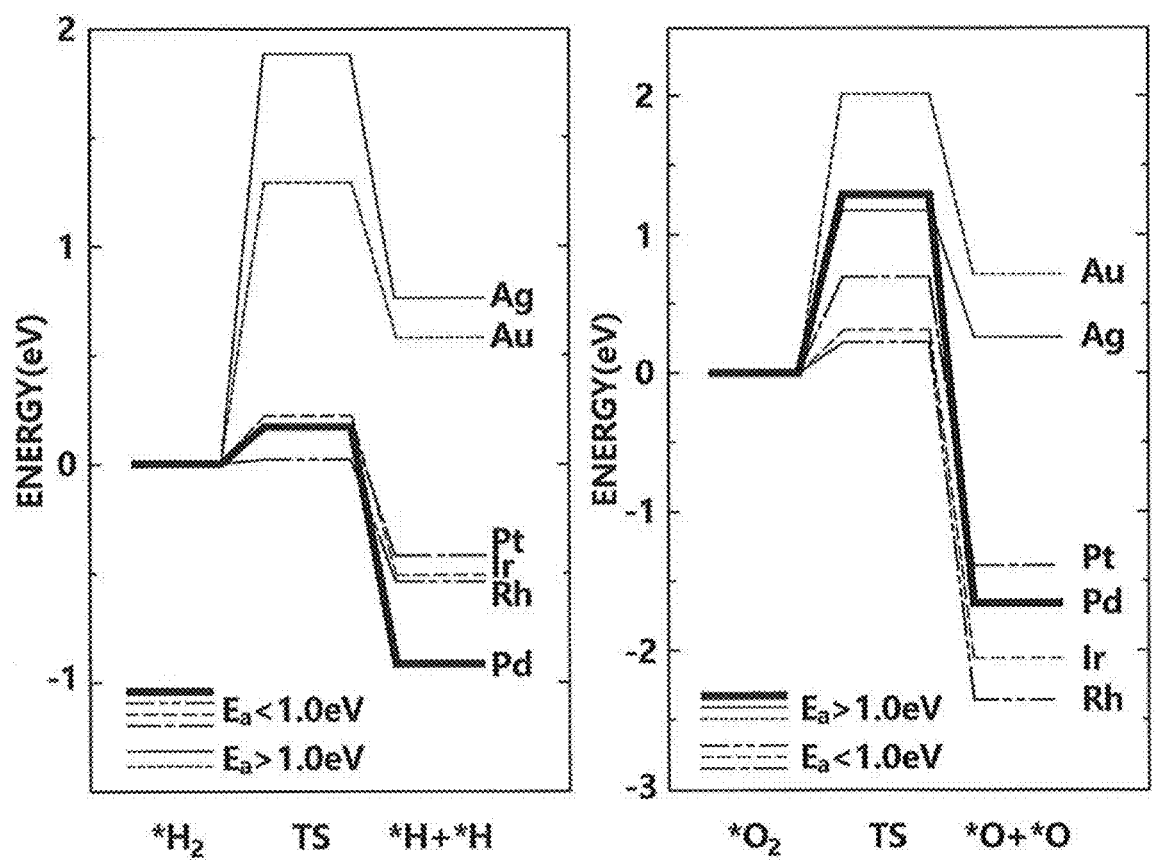

FIG. 2 is a diagram showing a graph on the left representing activation energies of various metal elements for dissociating hydrogen molecules and a graph on the right representing activation energies of various metal elements for dissociating oxygen molecules.

Figure 3:
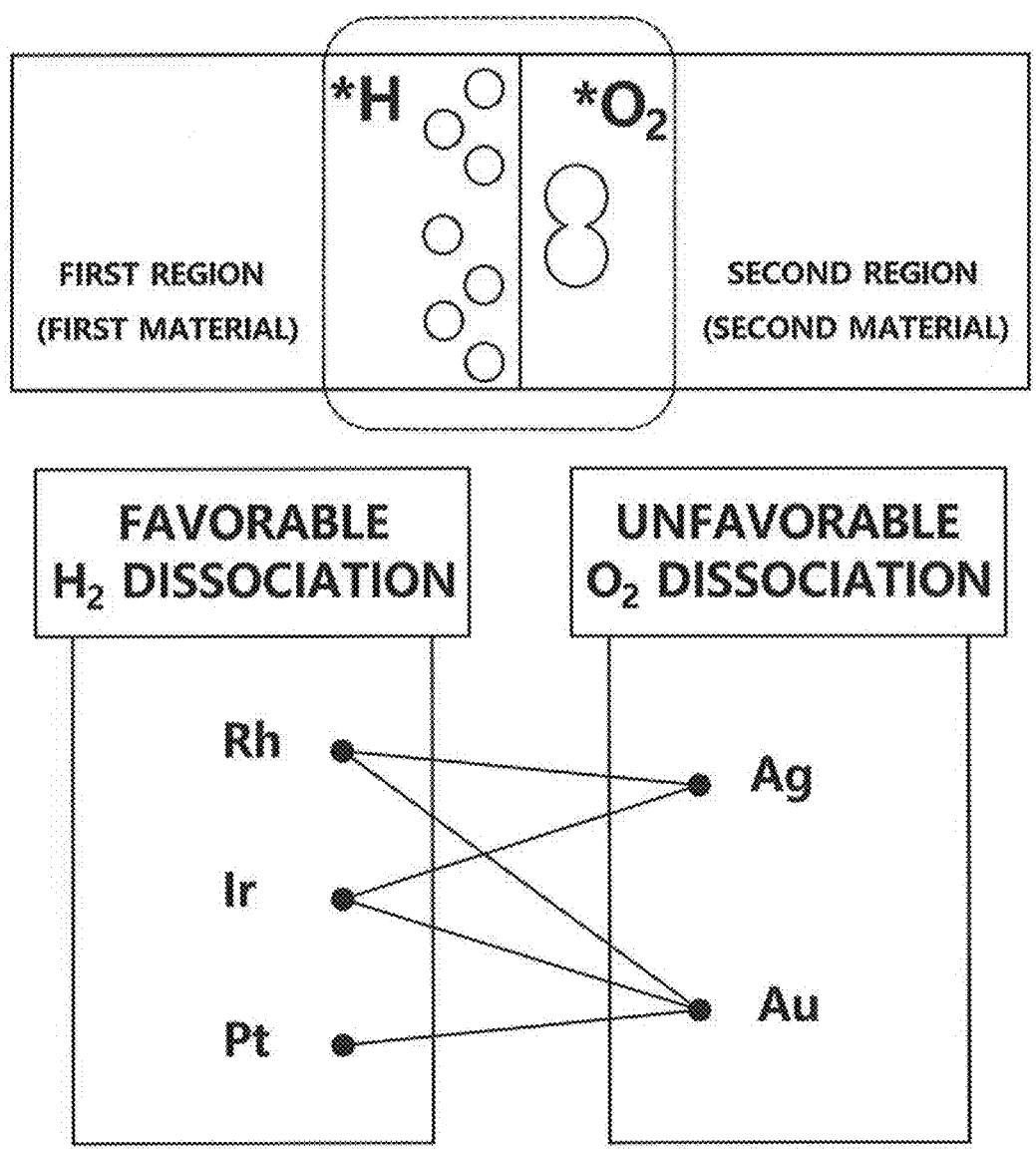

FIG. 3 is a drawing representing candidates for the first material and those for the second material in accordance with one example embodiment of the present invention.

Figure 4:
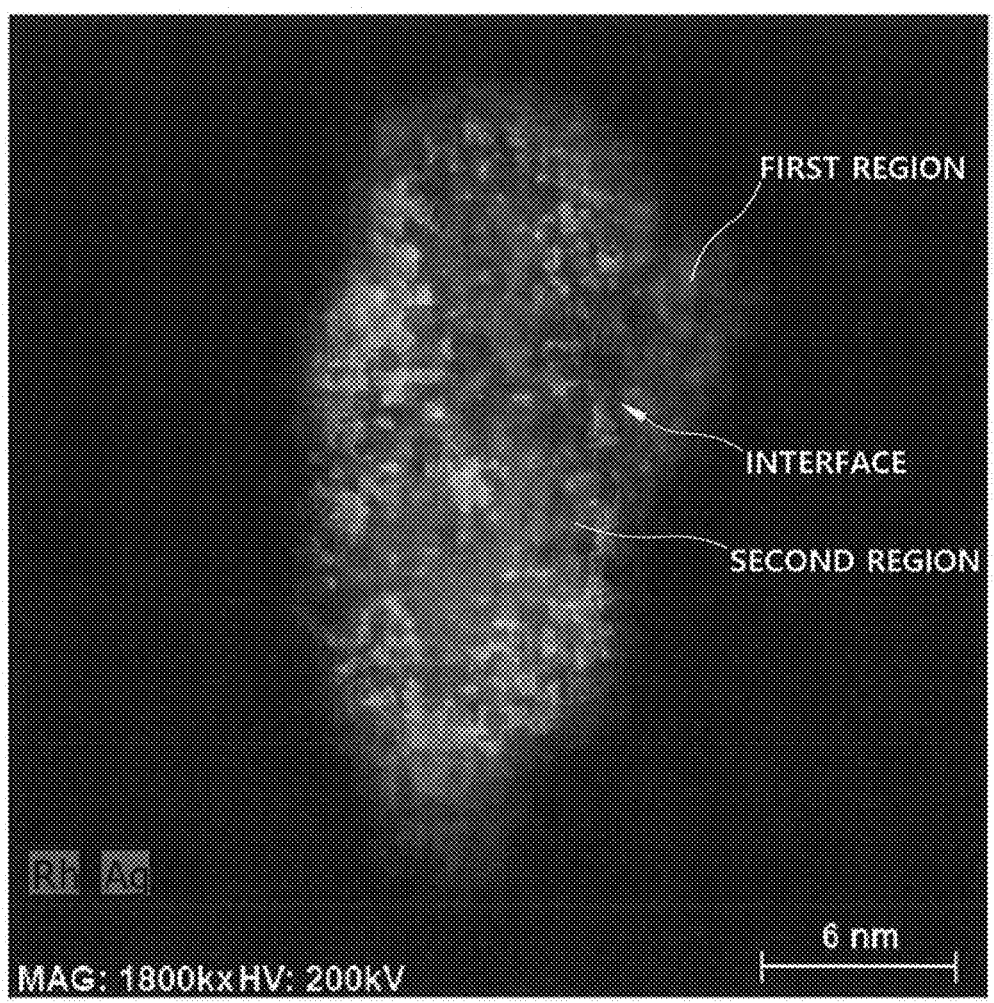

FIG. 4 is an image of a transmission electron microscope, i.e., TEM, showing $Rh_{50}Ag_{50}$ in accordance with one example embodiment of the present invention.

Figure 5:
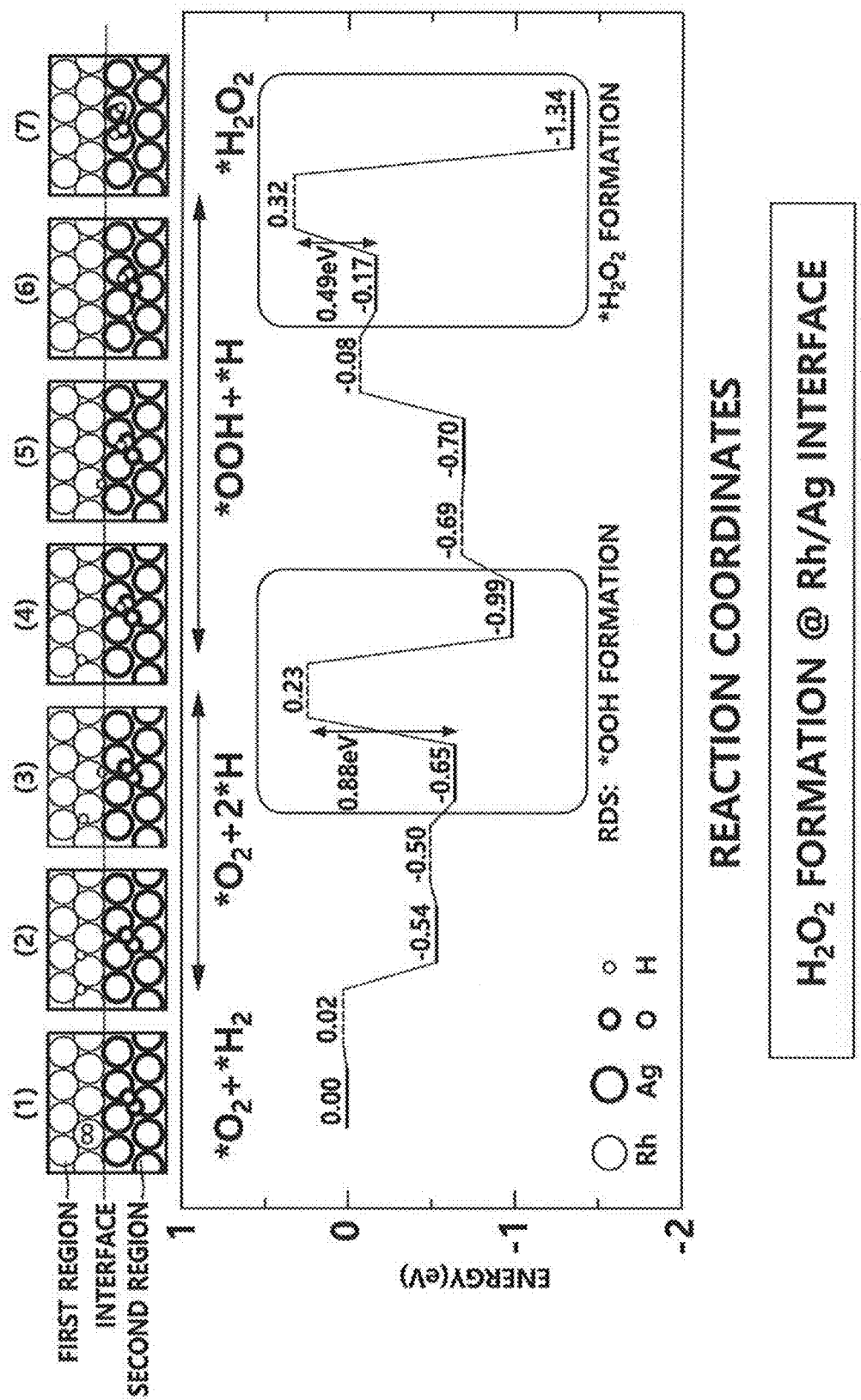

FIG. 5 is a graph representing reaction coordinates of the direct hydrogen peroxide synthesis using an Rh—Ag catalyst in accordance with one example embodiment of the present invention.

FIG. 6 is a diagram representing catalytic activities by compositions of Rh—Ag catalysts in accordance with one example embodiment of the present invention.

DETAILED DESCRIPTION OF THE PREFERRED EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention.

In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

FIG. 1 is a drawing representing first material and second material of a catalyst for hydrogen peroxide synthesis with one or more interfaces in accordance with one example embodiment of the present invention Referring to FIG. 1, the catalyst for direct synthesis of hydrogen peroxide in accordance with the present invention may include the first material capable of dissociating hydrogen molecules and the second material capable of suppressing dissociation of oxygen molecules.

The commercialization process has not been developed yet because the direct synthesis of hydrogen peroxide from hydrogen and oxygen is technically difficult although the reaction itself seems simple. For the direct synthesis of hydrogen peroxide, the catalyst has to perform a function of dissociating the hydrogen molecules, and a function of suppressing dissociation of the oxygen molecules and adsorbing the oxygen molecules thereon. Palladium shows high performance in those two functions and thus it is known as a good catalyst for the direct synthesis of hydrogen peroxide. But there is a disadvantage that the price of palladium is high.

Therefore, as an alternative to palladium, the first material capable of dissociating the hydrogen molecules easily and the second material capable of suppressing dissociation of the oxygen molecules are combined to form a nanocomposite in the present invention and it is shown that this kind of catalyst composite has activity for the direct synthesis of hydrogen peroxide.

Herein, the catalyst for the direct synthesis of hydrogen peroxide in accordance with the present invention may be an agglomerated form of the first material and the second material, where the interfaces can be formed between the first material and the second material. In this regard, the first and the second materials coexist on the interfaces. As can be seen in FIG. 1, the first material marked with ① and the second material marked with ② form the interfaces, and the two materials with the interfaces can be exposed through the surface of the agglomeration of the first material and the second material.

Meanwhile, the catalyst may be an immiscible composite which is a mixture of the first material and the second material while in a state other than solid solution. In accordance with the present invention, a novel catalyst was designed by combining the materials to form the immiscible composite that normally do not make a miscible alloy in which two or more materials are mixed into a homogeneous phase. With this, various combination of various materials may be considered due to their immiscibility.

Hereinafter, the first material and the second material are explained specifically by referring to FIGS. 2 and 3.

Referring to FIG. 2, the graph on the left shows activation energies of various metal elements for dissociating the hydrogen molecules. It can be seen that while rhodium, iridium, and platinum have dissociating ability similar to that of palladium, silver and gold have high activation energies for dissociating the hydrogen molecules. In addition, it can be seen that it is not stable in terms of energy for silver and gold to dissociate the hydrogen molecules.

Also, according to the graph on the right in FIG. 2, it can be seen that, while rhodium, iridium, and platinum easily dissociate the oxygen molecules, silver has activation energy similar to that of palladium and gold has activation energy bigger than that of palladium. Herein, these characteristics of silver and gold can suppress dissociation of the oxygen molecules. In addition, it can be seen that it is not stable in terms of energy for silver and gold to dissociate the oxygen molecules.

That is, referring to FIGS. 2 and 3, rhodium, iridium, and platinum are suitable candidates for the first material but the candidates are not limited thereto and any material with activation energy ($E_a$) smaller than 1.0 eV, or with ability to dissociate the hydrogen molecules easily can be used as the first material.

Also, silver and gold are suitable candidates for the second material but the candidates are not limited thereto. That is, any material with activation energy higher than 1.0 eV, or with ability to suppress dissociation of the oxygen molecules easily can be used as the second material.

Meanwhile, hydrogen peroxide can be produced within a predetermined threshold distance from the interfaces. As shown in FIG. 3, hydrogen peroxide can be produced near the interfaces between a first region where the first material exists and a second region where the second material exists, and more particularly, produced in the second region. A detailed process of hydrogen peroxide synthesis will be explained by referring to FIG. 5.

Hereinafter, the direct synthesis of hydrogen peroxide using Rh—Ag as a catalyst in accordance with one example embodiment of the present invention is explained by referring to FIG. 4 and FIG. 5.

FIG. 4 is a TEM, i.e., transmission electron microscope, image of $Rh_{50}Ag_{50}$ in accordance with one example embodiment of the present invention. In FIG. 4, it can be seen that the first region colored in red where rhodium exists and the second region colored in green where silver exists in the state other than solid solution form the interfaces therebetween, and that rhodium and silver are exposed through a surface of the catalyst, i.e., $Rh_{50}Ag_{50}$. The following method of synthesis was used to form the Rh—Ag composite.

The Rh—Ag catalyst was produced by mixing (i) a solution where 0.153 g of poly(N-vinyl-2-pyrrolidone), i.e., PVP, with a molecular weight of 55,000, and 0.012 g of $NaBH_4$ dissolved in 15 ml of distilled water are stirred with a magnetic stirrer at 1000 rpm in an ice bath and (ii) a solution of silver nitrate ($AgNO_3$) and rhodium acetate ($Rh(CH_3OO)_3$) dissolved in 5 ml of distilled water. These synthesized particles were centrifuged in acetone of 1:5 vol % at 10,000 rpm for 20 minutes and then, washed with ethanol and hexane. After being dispersed in 5 mL of ethylene glycol, those washed Rh—Ag nanoparticles were heated for an hour at 170° C. while being stirred. Herein, the Rh—Ag composite may also be obtained without the heating process.

Meanwhile, the direct synthesis of hydrogen peroxide using the catalyst or the catalyst composite in accordance with the present invention may include steps of (a) bringing the hydrogen molecules and the oxygen molecules into contact with the catalyst or the catalyst composite in a reaction vessel, and (b) performing reactions of (i) producing two hydrogen atoms from dissociation of a hydrogen molecule by the first material in the first region, (ii) forming OOH as a result of one hydrogen atom dissociated in the first region arriving at the second region across the interface and combining with the oxygen molecule adsorbed on the second region, and (iii) producing hydrogen peroxide as a result of the other hydrogen atom dissociated in the first region arriving at the second region across the interface and combining with the OOH adsorbed on the second region.

Specifically, referring to FIG. 5, to explain the direct synthesis in accordance with the present invention, a process needed for a reaction of the hydrogen molecules and the oxygen molecules to produce hydrogen peroxide is represented by (1) to (7) of FIG. 5 and reaction coordinates of the direct synthesis are presented in a graph.

Specifically, if a hydrogen molecule and an oxygen molecule make contact with the Rh—Ag catalyst respectively as illustrated in (1), two hydrogen atoms are produced from the hydrogen molecule dissociated by rhodium in the first region while the oxygen molecule is not dissociated by silver and adsorbed as a molecule in the second region as illustrated in (2). Herein, many hydrogen molecules and many oxygen molecules can be both dissociated in the middle of the first region away from the interfaces more than the predetermined threshold distance, or both of the hydrogen molecule and the oxygen molecule may maintain their molecular state in the middle of the second region away from the interfaces more than the predetermined threshold distance. Therefore, it will be described under the assumption that hydrogen peroxide is produced near the interfaces, more specifically in the second region near the interfaces.

Next, one hydrogen atom dissociated in the first region crosses a part of the interfaces as in (3) and combines with the oxygen molecule on the second region to thereby form OOH as in (4). Herein, the activation energy of the OOH formation step which is a rate-determining step, i.e., RDS, of the direct synthesis of hydrogen peroxide is calculated as 0.88 eV which is smaller than 0.91 eV known as the activation energy for Pd to form OOH. That is, the catalyst in accordance with the present invention can be comparable to a conventional Pd catalyst.

Meanwhile, the other hydrogen atom crosses a part of the interfaces as in (5), arrives at the second region as in (6), and combines with the OOH on the second region to thereby produce hydrogen peroxide as in (7).

Herein, the two hydrogen atoms from dissociation of the hydrogen molecule in (1) are described as all combining with one oxygen molecule but this is for convenience of understanding the present invention, i.e., the scope of the present invention is not limited thereto. Further, although the aforementioned processes in which after one hydrogen atom crosses the part of interfaces forming the OOH, the other hydrogen atom crosses the part of the interfaces are described as can be seen in (3) to (5), this is only for convenience of understanding the present invention, and the scope of the present invention is not limited thereto.

Hereinafter, catalytic activities by composition of the catalyst including Rh—Ag in accordance with one example embodiment of the present invention is explained by referring to FIG. 6.

For comparison of the catalytic activities, each of 0.158 mg of catalysts, i.e., $Rh_xAg_{100-x}$ in the example embodiments and other catalysts in the comparative examples of FIG. 6, 2 mL of DI water-ethanol (20%), 0.02M of $H_3PO_4$, and 0.9 mM of NaBr were used to synthesize hydrogen peroxide where the total gas flow was 70 mL/min and a volume ratio of gases was oxygen:hydrogen=10:1. In particular, with respect to $Rh_xAg_{100-x}$ in the example embodiments, the detection results of the produced amounts of hydrogen peroxide after 30 minutes and 60 minutes of the direct synthesis are acquired by respective ratios of the composition of $R_xAg_{100-x}$ as shown in a chart of FIG. 6.

Referring to FIG. 6, as represented in the comparative examples, it can be seen that hydrogen peroxide is undetected or produced in a very small amount, in the case of using each of Rh or Ag as a separate catalyst and in the case of using both Rh and Ag not in a form of a composite as a catalyst.

On the other hand, referring to the various examples of FIG. 6, it can be seen that all of $Rh_{90}Ag_{10}$ to $Rh_1Ag_{99}$ contribute to the production of hydrogen peroxide. Herein, it can be seen that the two materials each of which do not have activity for the synthesis of hydrogen peroxide can be used as a catalyst for the synthesis by combining them in a composite.

Furthermore, in the case of $Rh_{50}Ag_{50}$ to $Rh_{10}Ag_{90}$, high production amounts of 5 ppm and 10 ppm were respectively detected after 30 minutes and 60 minutes of performing the direct synthesis.

Meanwhile, in the case of $Rh_7Ag_{93}$ to $Rh_2Ag_{98}$, hydrogen peroxide production amounted to 5~10 ppm even after 30 minutes, thus an increase of hydrogen peroxide yield can be verified. Accordingly, as the ratio of Ag included in the composite increases, the hydrogen peroxide yield roughly increases. Therefore it can be seen that the catalyst in accordance with the present invention has competitive edge in price.

Also, as a result of performing experiments to compare the catalytic activities between the $Rh_{10}Ag_{90}$ catalyst in accordance with the present invention and the conventional $Pd_{100}$ catalyst, yield of hydrogen peroxide was 120.3 mmol/gh when synthesized with $Pd_{100}$ (cube), and 67.4 mmol/gh when synthesized with $Rh_{10}Ag_{90}$, therefore it can be seen that $Rh_{10}Ag_{90}$ produces 56% of $H_2O_2$ compared to that produced by $Pd_{100}$.

In this regard, considering the price of Pd is 24,444.44 $/kg, that of Rh is 28,747.80 $/kg, and that of Ag is 654.32 $/kg as of Nov. 11, 2016, the price of raw material is 24,444.44 $/kg for $Pd_{100}$ and 3,463.67 $/kg for $Rh_{10}Ag_{90}$. Therefore, $Rh_{10}Ag_{90}$ costs only about one-seventh the price of $Pd_{100}$.

That is, when compared in $H_2O_2$ production by price, $Rh_{10}Ag_{90}$ has the quadruple of production compared to $Pd_{100}$. Hereby, the catalyst in accordance with the present invention is shown to have competitive edge in price and high activity as an alternative to the palladium catalyst in the direct synthesis.

The present invention has an effect of providing a novel composition of the catalyst for the synthesis of hydrogen peroxide.

The present invention has another effect of providing the novel catalyst with high activity and high efficiency as an alternative to the expensive palladium catalysts.

The present invention has still another effect of providing a method for the direct synthesis of hydrogen peroxide using the novel catalyst.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims, pertain to the category of the thought of the present invention.

What is claimed is:

1. A catalyst for synthesizing hydrogen peroxide, comprising:
a nanocomposite of a first material capable of dissociating hydrogen molecules and a second material capable of suppressing dissociation of oxygen molecules, wherein at least a portion of the first material and at least a portion of the second material are exposed through a surface of the catalyst and contact one another to form at least one interface wherein the at least a portion of the first material is in physical contact with the at least a portion of the second material,
wherein the molar ratio of the first material to the second material is from 50:50 to 2:98,
wherein the first material and the second material do not form an alloy,
and wherein the nanocomposite is an immiscible composite which is a mixture of the first material and the second material in a state other than solid solution.

2. The catalyst of claim 1, wherein the catalyst has activity for direct synthesis of the hydrogen peroxide.

3. The catalyst of claim 1, wherein the first material is selected from rhodium, iridium, and platinum.

4. The catalyst of claim 1, wherein the first material is selected from materials whose activation energies for dissociating the hydrogen molecules are smaller than 1.0 eV.

5. The catalyst of claim 1, wherein the second material is selected from silver and gold.

6. The catalyst of claim 1, wherein the second material is selected from materials whose activation energies for dissociating the oxygen molecules are bigger than 1.0 eV.

7. A method for direct synthesis of hydrogen peroxide, comprising the steps of:
(a) supplying hydrogen molecules and oxygen molecules to a catalyst in a reaction vessel, wherein the catalyst includes a nanocomposite having a first region composed of a first material capable of dissociating hydrogen molecules and a second region composed of a second material capable of suppressing dissociation of oxygen molecules, wherein at least a portion of the first region and at least a portion of the second region are exposed through a surface of the catalyst and contact one another to form at least one interface wherein the at least a portion of the first region is in physical contact with the at least a portion of the second region,
wherein the first material and the second material do not form an alloy,
and wherein the nanocomposite is an immiscible composite which is a mixture of the first material and the second material in a state other than solid solution; and
(b) performing reactions of (i) producing two hydrogen atoms from dissociation of a hydrogen molecule by the first material in the first region, (ii) forming OOH as a result of one hydrogen atom dissociated in the first region arriving at the second region across a part of the interfaces and combining with an oxygen molecule adsorbed on the second region, and (iii) producing hydrogen peroxide as a result of the other hydrogen atom dissociated in the first region arriving at the second region across the part of the interfaces and combining with the OOH adsorbed on the second region.

8. The method of claim 7, wherein the step of the reaction of forming the OOH is determined as a rate determining step of hydrogen peroxide synthesis.

9. The method of claim 7, wherein the hydrogen peroxide is produced within a predetermined threshold distance from the one or more interface regions.

10. The method of claim 7, wherein hydrogen peroxide is produced in the second region.

11. A catalyst for synthesizing hydrogen peroxide, consisting of:
a nanocomposite of a first material capable of dissociating hydrogen molecules and a second material capable of suppressing dissociation of oxygen molecules, wherein at least a portion of the first material and at least a portion of the second material are exposed through a surface of the catalyst and contact one another to form at least one interface wherein the at least a portion of the first material is in physical contact with the at least a portion of the second material,
wherein the molar ratio of the first material to the second material is from 50:50 to 2:98,
wherein the first material and the second material do not form an alloy,
and wherein the nanocomposite is an immiscible composite which is a mixture of the first material and the second material in a state other than solid solution.

* * * * *